(12) United States Patent
Kanbara et al.

(10) Patent No.: US 11,639,423 B2
(45) Date of Patent: May 2, 2023

(54) RESIN COMPOSITION, COATING COMPOSITION, AND COATED ARTICLE

(71) Applicant: Mitsubishi Chemical Corporation, Chiyoda-ku (JP)

(72) Inventors: Riina Kanbara, Tokyo (JP); Takafumi Asai, Tokyo (JP); Masashi Serizawa, Tokyo (JP); Takahiro Mukuda, Tokyo (JP); Yoshihiro Kamon, Tokyo (JP)

(73) Assignee: Mitsubishi Chemical Corporation, Chiyoda-ku (JP)

(*) Notice: Subject to any disclaimer, the term of this patent is extended or adjusted under 35 U.S.C. 154(b) by 0 days.

(21) Appl. No.: 16/878,739

(22) Filed: May 20, 2020

(65) Prior Publication Data
US 2020/0277447 A1 Sep. 3, 2020

Related U.S. Application Data

(63) Continuation of application No. PCT/JP2018/043776, filed on Nov. 28, 2018.

(30) Foreign Application Priority Data

Dec. 22, 2017 (JP) .............................. JP2017-245933

(51) Int. Cl.
| | |
|---|---|
| C09D 7/62 | (2018.01) |
| C08G 18/73 | (2006.01) |
| C08K 3/36 | (2006.01) |
| C08K 9/06 | (2006.01) |
| C08G 83/00 | (2006.01) |
| C08G 18/75 | (2006.01) |
| C08K 5/00 | (2006.01) |
| C08K 5/3492 | (2006.01) |
| C09D 201/00 | (2006.01) |

(52) U.S. Cl.
CPC .......... *C08G 83/003* (2013.01); *C08G 18/73* (2013.01); *C08G 18/755* (2013.01); *C08G 83/005* (2013.01); *C08K 3/36* (2013.01); *C08K 5/005* (2013.01); *C08K 5/3492* (2013.01); *C08K 9/06* (2013.01); *C09D 7/62* (2018.01); *C09D 201/005* (2013.01); *C08K 2201/003* (2013.01)

(58) Field of Classification Search
CPC .... C09D 201/005; C09D 7/62; C08G 83/003; C08G 18/73; C08G 18/755; C08G 83/005; C08K 3/36; C08K 5/005; C08K 5/3492; C08K 9/06; C08K 2201/003
USPC ...................................................... 524/590
See application file for complete search history.

(56) References Cited

U.S. PATENT DOCUMENTS

| | | | |
|---|---|---|---|
| 5,780,530 A | 7/1998 | Mizutani et al. | |
| 2004/0171755 A1 | 9/2004 | Yokoyama et al. | |
| 2009/0270555 A1 | 10/2009 | Satoh et al. | |
| 2011/0127000 A1 | 6/2011 | Yazaki et al. | |
| 2014/0142251 A1 | 5/2014 | Liang et al. | |

FOREIGN PATENT DOCUMENTS

| | | | |
|---|---|---|---|
| CA | 2 476 851 A1 | 8/2003 | |
| CN | 101678392 A | 3/2010 | |
| CN | 101679589 A | 3/2010 | |
| CN | 104403548 A | 3/2015 | |
| EP | 1242509 A1 | 9/2002 | |
| JP | 08-034828 A | 2/1996 | |
| JP | 10-045867 A | 2/1998 | |
| JP | 10045867 A * | 2/1998 | |
| JP | 10-067844 A | 3/1998 | |
| JP | 2006-16560 | 1/2006 | |
| JP | 2006016560 A * | 1/2006 | .......... C08L 101/005 |
| JP | 2006-241234 A | 9/2006 | |
| JP | 2010-222228 A | 10/2010 | |
| JP | 2011-111693 A | 6/2011 | |
| JP | 2012-021111 A | 2/2012 | |
| JP | 2012021111 A * | 2/2012 | |
| JP | 2012-102210 A | 5/2012 | |
| JP | 2012-512238 A | 5/2012 | |
| JP | 2012102210 A * | 5/2012 | ......... C08G 18/4213 |
| JP | 2012-144654 A | 8/2012 | |
| JP | 2013-001897 A | 1/2013 | |
| JP | 2013-79323 A | 5/2013 | |
| JP | 2013079323 A * | 5/2013 | |
| JP | 2014-523943 A | 9/2014 | |
| WO | WO 2007/040187 A1 | 4/2007 | |

OTHER PUBLICATIONS

Office Action dated Jan. 24, 2022 in corresponding Chinese Patent Application No. 201880079279.3 (with English Translation), 14 pages.
Combined Taiwanese Office Action and Search Report dated Feb. 16, 2022 in Taiwanese Patent Application No. 107143250 (with English translation), 12 pages.
Third Party Observation issued Sep. 21, 2021 in Japanese Patent Application No. 2018-563939 (with English translation), 25 pages.
Indian Office Action dated Nov. 12, 2021 in Indian Patent Application No. 202017021433 (with English translation), 6 pages.

(Continued)

*Primary Examiner* — Kelechi C Egwim
(74) *Attorney, Agent, or Firm* — Oblon, McClelland, Maier & Neustadt, L.L.P.

(57) ABSTRACT

Provided is a resin composition for producing a coating composition excellent in appearance, abrasion resistance, and hardness of a coating film. The resin composition of the present invention includes a compound A having a branched structure which has a terminal hydroxyl group, a polyisocyanate B, and an inorganic particle C, in which the inorganic particle C has a functional group enabling reacting with a hydroxyl group or an isocyanate group on a surface thereof.

20 Claims, No Drawings

(56) References Cited

OTHER PUBLICATIONS

Combined Chinese Office Action and Search Report dated Aug. 4, 2021 in corresponding Chinese Patent Application No. 201880079279.3 (with English Translation) 25 pages.
Zhang Xiaohui et al., "Synthesis of Hyperbranched Polyurethane and its Application in Coatings", Paint & Coatings Industry, vol. 45, No. 2,Feb. 28, 2015, pp. 73-79 (with English Abstract).
Office Action dated Jul. 13, 2021 in corresponding Indonesian Patent Application No. P00202004507 (with English Translation), 8 pages.
International Search Report dated Feb. 12, 2019 in PCT/JP2018/043776 filed on Nov. 28, 2018 (with English Translation), 6 pages.
Taiwanese Office Action dated Aug. 31, 2022, in Taiwanese Patent Application No. 107143250 (with English Translation).
Notice of Reasons for Refusal dated Apr. 12, 2022 in Japanese Patent Application No. 2018-563939 (with English machine translation), 8 pages.

\* cited by examiner

RESIN COMPOSITION, COATING COMPOSITION, AND COATED ARTICLE

This application is a continuation application of International Application No. PCT/JP2018/043776, filed on Nov. 28, 2018, which claims the benefit of priority of the prior Japanese Patent Application No. 2017-245933, filed on Dec. 22, 2017, the content of which is incorporated herein by reference.

TECHNICAL FIELD

The present invention relates to a resin composition, a coating composition, and a coated article.

BACKGROUND ART

Synthetic resins such as acrylic resins, polycarbonate resins, polystyrene resins, and ABS resins are easy to mold, lightweight, and excellent in impact resistance, and are used in various fields. However, surfaces of these resin molded articles have insufficient abrasion resistance and hardness, and thus have a problem that scratches or dents easily occur.

In order to solve the problem, it is known that a surface of a resin molded article is coated with a coating material containing a urethane resin composition.

For example, Patent Literature 1 and Patent Literature 2 disclose a urethane resin composition containing a specific polyol compound, a polyisocyanate compound, and silica particles.

CITATION LIST

Patent Literature

[Patent Literature 1] Japanese Unexamined Patent Application, First Publication No. 2013-01897
[Patent Literature 2] Japanese Unexamined Patent Application, First Publication No H10-45867

SUMMARY OF INVENTION

Technical Problem

However, the urethane resin composition disclosed in Patent Literatures 1 and 2 were insufficient in the appearance, abrasion resistance, and hardness of a coating film.

An object of the present invention is to provide a coating composition excellent in appearance, abrasion resistance, and hardness of a coating film and a resin composition for producing the coating composition.

Solution to Problem

The present invention has the following aspects.

[1] A resin composition including a compound A having a branched structure which has a terminal hydroxyl group; a polyisocyanate B; and an inorganic particle C, in which the inorganic particle C has a functional group enabling reacting with a hydroxyl group or an isocyanate group on a surface thereof.

[2] The resin composition according to [1], in which the compound A is a polymer having a dendritic branched structure.

[3] The resin composition according to [1] or [2], in which the compound A is a hyperbranched polymer having a terminal hydroxyl group.

[4] The resin composition according to any one of [1] to [3], in which a content of the compound A in a total mass (100% by mass) of the compound A, the polyisocyanate B, and the inorganic particle C is 5% by mass to 50% by mass.

[5] The resin composition according to any one of [2] to [4], in which a weight average molecular weight of the polymer having a dendritic branched structure is 550 to 30,000.

[6] The resin composition according to any one of [1] to [5], in which the compound A has a hydroxyl value of 20 mg KOH/g to 1,000 mg KOH/g.

[7] The resin composition according to any one of [1] to [6], in which the polyisocyanate B is a trifunctional or higher functional isocyanate.

[8] The resin composition according to any one of [1] to [7], in which the functional group enabling reacting with a hydroxyl group or an isocyanate group of the inorganic particle C is selected from the group consisting of a mercapto group, an isocyanate group, and an epoxy group.

[9] The resin composition according to any one of [1] to [8], in which the inorganic particle C is a silica particle surface-treated with a silane coupling agent having a functional group enabling reacting with a hydroxyl group or an isocyanate group.

[10] The resin composition according to any one of [1] to [9], in which a content of the inorganic particle C in the total mass (100% by mass) of the compound A, the polyisocyanate B, and the inorganic particle C is equal to or more than 1% by mass and less than 55% by mass.

[11] The resin composition according to any one of [1] to [10], further including at least one ultraviolet absorbing agent selected from the group consisting of a triazine-based ultraviolet absorbing agent, a benzophenone-based ultraviolet absorbing agent, a benzotriazole-based ultraviolet absorbing agent, a phenyl salicylate-based ultraviolet absorbing agent, and a phenyl benzoate-based ultraviolet absorbing agent.

[12] A coating composition including the resin composition according to any one of [1] to [11].

[13] A coated article having a coating film formed of the coating composition according to [12].

Advantageous Effects of Invention

Using the resin composition of the present invention, it is possible to provide a coating composition having excellent in appearance, abrasion resistance, and hardness of a coating film.

DESCRIPTION OF EMBODIMENTS

[Resin Composition]
The resin composition of the present invention includes a compound A having a branched structure which has a terminal hydroxyl group, a polyisocyanate B, and an inorganic particle C.

<Compound a Having a Branched Structure which has a Terminal Hydroxyl Group>

The compound A in the present invention has a branched structure, and includes one or a plurality of terminal hydroxyl groups of the branched structure.

By including a terminal hydroxyl group of the branched structure, a cross-linking density of the coating film formed of the resin composition of the present invention increases, and abrasion resistance and hardness of the coating film is improved.

Examples of the compound A include alcohols having a branched structure and polymers having a dendritic branched structure having a terminal hydroxyl group.

A polymer having a dendritic branched structure including a terminal hydroxyl group is preferable from a viewpoint of improving abrasion resistance and hardness, even in a case where a content of the inorganic particle C is small.

Examples of the alcohols having a branched structure include methylpropanediol, trimethylolethane, trimethylolpropane, glycerol, polycaprolactonetriol, erythritol, pentaerythritol, polycaprolactonetetraol, and the like.

Examples of the polymer having a dendritic branched structure include a dendrimer, a hyperbranched polymer, and a hyperbranched polymer is preferable from a viewpoint that synthesis is simple and industrial production is easy.

Examples of the dendrimer include Boltorn (registered trademark, the same hereinafter) H20 (hydroxyl value of 490 to 520 mg KOH/g, weight average molecular weight (Mw) of 2,100 (catalog value)) manufactured by Perstorp Corporation, Boltorn H311 (hydroxyl value of 230 to 260 mg KOH/g, weight average molecular weight (Mw) of 5,700 (catalog value)), Boltorn H2004 (hydroxyl value of 105 to 125 mg KOH/g, weight average molecular weight (Mw) of 3,200 (catalog value)), Boltorn P500 (hydroxyl value of 560 to 630 mg KOH/g, weight average molecular weight (Mw) of 1,800 (catalog value)), Boltorn P1000 (hydroxyl value of 430 to 490 mg KOH/g, weight average molecular weight (Mw) of 1,500 (catalog value)), Boltorn U3000 (hydroxyl value of 15 mg KOH/g, weight average molecular weight (Mw) of 6,500 (catalog value)), Boltorn W3000 (hydroxyl value of 15 mg KOH/g, weight average molecular weight (Mw) of 9,000 (catalog value)), and the like.

Examples of the hyperbranched polymer include Basonol (registered trademark, the same hereinafter) HPE 1170B (hydroxyl value of 280 mg KOH/g, weight average molecular weight (Mw) of 1,800 (catalog value)) manufactured by BASF Corporation, Basonol HPE 021 (hydroxyl value of 190 mg KOH/g, weight average molecular weight (Mw) of 1,400 (catalog value)), Basonol HPE-026 (hydroxyl value of 180 mg KOH/g, weight average molecular weight (Mw) of 2,600 (catalog value)), Basonol HPE-046 (hydroxyl value of 250 mg KOH/g, weight average molecular weight (Mw) of 4,800 (catalog value)), and the like.

The compound A may be used alone or two or more thereof may be used in combination.

In addition, a molecular weight of the compound A (in a case where the compound A is a polymer, it means weight average molecular weight) is preferably 550 to 30,000, more preferably 600 to 10,000, and further more preferably 800 to 5,000.

In a case where the molecular weight of the compound A is equal to or more than the lower limit, hardness of the coating film is easily improved. In a case where the weight average molecular weight of the compound A is equal to or less than the upper limit, appearance of the coating film is easily improved.

A weight average molecular weight in a case where the compound A is a polymer is a weight average molecular weight (Mw) in terms of standard polystyrene measured by gel permeation chromatography (GPC).

The compound A preferably has three or more hydroxyl groups per molecule.

By including three or more hydroxyl groups per molecule, the cross-linking density of the coating film is increased, and abrasion resistance and hardness are easily improved.

The hydroxyl value of the compound A is preferably from 20 mg KOH/g to 1,000 mg KOH/g and more preferably from 50 mg KOH/g to 600 mg KOH/g.

In a case where the hydroxyl value of the compound A is equal to or more than the lower limit, hardness of the coating film is easily improved. In a case where the hydroxyl value of the compound A is equal to or less than the upper limit, solubility of the compound A in the resin composition easily becomes favorable.

The content of the compound A in the resin composition of the present invention is preferably 5% by mass to 50% by mass, more preferably 5% by mass to 40% by mass, and further more preferably 5% by mass to 30% by mass, with respect to the total mass (100% by mass) of the compound A, the polyisocyanate B, and the inorganic particle C.

In a case where the content of the compound A is equal to or less than the upper limit, abrasion resistance and hardness of the obtained coating film are easily improved. In a case where the content of the compound A is equal to or more than the lower limit, appearance of the obtained coating film and drying properties after forming the coating film are easily improved.

<Polyisocyanate B>

The polyisocyanate B in the present invention forms a urethane bond by reacting with the hydroxyl group of the compound A, increases the cross-linking density of the coating film, and improves weather resistance and stain resistance.

Examples of the polyisocyanate B include bifunctional isocyanates such as hexamethylene diisocyanate, dicyclohexylmethane diisocyanate, isophorone diisocyanate, 1,3-bis(isocyanatomethyl)cyclohexane, and 4,4-dicyclohexyl diisocyanate, trifunctional or higher functional isocyanates such as a biuret derivative obtained by synthesizing with the bifunctional isocyanate as a starting material, a trimethylolpropane adduct body, an isocyanurate derivative, an allophanate derivative, and the like.

Examples of the trifunctional or higher functional isocyanate include a biuret of hexamethylene diisocyanate manufactured by Asahi Kasei Corporation (product name: Duranate (registered trademark, the same hereinafter)) 24A-100), an adduct body of hexamethylene diisocyanate (product name: Duranate P-301-75E), an isocyanurate derivative of hexamethylene diisocyanate (product name: Duranate TPA-100), a blocked isocyanate (product name: Duranate MF-K60X), a trimethylolpropane adduct body of 1,3-bis (isocyanatomethyl) cyclohexane (product name: Takenate (registered trademark, the same hereinafter) D-120N) manufactured by Mitsui Chemicals, Inc., an isocyanurate derivative of 1,3-bis (isocyanatomethyl) cyclohexane (product name: Takenate D-127N), a trimethylolpropane adduct body of isophorone diisocyanate (product name: Takenate D-140N), an allophanate derivative of hexamethylene diisocyanate (product name: Desmodur (registered trademark, the same hereinafter) XP2679 manufactured by Sumika Covestro Urethane Co., Ltd.), and the like.

The polyisocyanate B is preferably a trifunctional or higher functional isocyanate from a viewpoint of increasing the cross-linking density of the coating film and improving weather resistance and stain resistance.

The polyisocyanate B may be used alone or two or more thereof may be used in combination.

An equivalent ratio of the isocyanate group of the polyisocyanate B to the hydroxyl group of the compound A (isocyanate group (mol) of the polyisocyanate B/hydroxyl group (mol) of the compound A) is preferably 0.5 to 2.0, and more preferably 0.7 to 1.8.

In a case where the equivalent ratio of the isocyanate groups of the polyisocyanate B is equal to or more than the lower limit, the cross-linking density of the coating film is increased, and solvent resistance, water resistance, and weather resistance are easily improved. In a case where the equivalent ratio of the isocyanate group of the polyisocyanate B is equal to or less than the upper limit, drying properties after forming the coating film is easily improved.

<Inorganic Particle C>

The inorganic particle C in the present invention has a functional group enabling reacting with a hydroxyl group or a functional group enabling reacting with an isocyanate group on the surface.

In a case where the inorganic particle C has a functional group enabling reacting with a hydroxyl group or an isocyanate group on the surface, abrasion resistance of the coating film is improved.

Examples of the functional group enabling reacting with a hydroxyl group or an isocyanate group include a mercapto group, an isocyanate group, an epoxy group, a hydroxyl group, an amino group, a carbamoyl group, and the like.

Since reactivity with the hydroxyl group or the isocyanate group is high, the functional group enabling reacting with the hydroxyl group or the isocyanate group of the inorganic particle C is preferably a mercapto group, an isocyanate group, or an epoxy group.

The inorganic particle C can be obtained by subjecting silica particles not having a functional group enabling reacting with a hydroxyl group or an isocyanate group on the surface with a silane coupling agent having a functional group enabling reacting with a hydroxyl group or an isocyanate group, for example.

Examples of a dispersion solution of the inorganic particle C include SIRMEK20 WT %-M70, SIRMEK50 WT %-E86, SIRMIBK15 WT %-M96, and SIRMIBK30 WT %-S39 manufactured by CIK Nanotech Corporation, and MEK-EC-2130Y, MEK-EC-6150P, and MEK-EC-7150P manufactured by Nissan Chemical Industries, Ltd., for example.

The inorganic particle C may be used alone or two or more thereof may be used in combination.

The content of the inorganic particle C in the resin composition of the present invention is preferably equal to or more than 1% by mass and less than 55% by mass, more preferably 1% by mass to 30% by mass, and further more preferably 1% by mass to 10% by mass, with respect to the total mass (100% by mass) of the compound A, the polyisocyanate B, and the inorganic particles C.

In a case where the content of the inorganic particle C is equal to or less than the upper limit, high appearance can be easily maintained for a long period of time, and the cost can be easily reduced. In a case where the content of the inorganic particle C is equal to or more than the lower limit, abrasion resistance and hardness of the obtained coating film are easily improved.

In addition, the upper limit of the average particle diameter of the inorganic particle C is preferably equal to or less than 300 nm, more preferably equal to or less than 100 nm, and still more preferably equal to or less than 50 nm. The lower limit of the average particle diameter is preferably 2 nm or more, and more preferably 4 nm or more. For example, the average particle diameter of the inorganic particle C is preferably 2 nm to 300 nm, more preferably 2 nm to 100 nm, further preferably 4 nm to 100 nm, and particularly preferably 4 nm to 50 nm.

In a case where the average particle diameter of the inorganic particle C is equal to or more than the lower limit, abrasion resistance is easily improved. In a case where the average particle diameter of the inorganic particle C is equal to or less than the upper limit, transparency of the coating film is easily maintained.

As the average particle diameter of the inorganic particle C, a value converted from a specific surface area measurement value (in accordance with JIS Z8830) by a BET adsorption method is used.

<Other Components>

The resin composition of the present invention may contain other components in addition to the compound A, the polyisocyanate B, and the inorganic particle C as long as the gist of the present invention is not impaired.

For example, the resin composition of the present invention may contain a linear compound having a terminal hydroxyl group.

Examples of the linear compound having a hydroxyl group at the terminal include glycol, 1,4-butanediol, 1,6-hexanediol, polycarbonate diol, polyester diol, polyether diol, and the like.

Among these, polycarbonate diol is preferable from a viewpoint of maintaining high hardness and high appearance for a long period of time.

A molecular weight of the polycarbonate diol in terms of weight average molecular weight (Mw) is preferably 300 to 10,000, more preferably 400 to 8,000, and further more preferably 500 to 7,500, in terms of the weight average molecular weight (Mw).

In a case where the weight average molecular weight (Mw) of the polycarbonate diol is equal to or more than the lower limit, high appearance is easily maintained for a long period of time. In a case where the weight average molecular weight (Mw) of the polycarbonate diol is equal to or less than the upper limit, scratch resistance is easily improved.

The resin composition of the present invention may contain a weather resistance imparting agent such as an ultraviolet absorbing agent and a photostabilizer to impart weather resistance to the coating film.

As the weather resistance imparting agent, it is preferable to use an ultraviolet absorbing agent and more preferable to use an ultraviolet absorbing agent and a photostabilizer in combination.

The ultraviolet absorbing agent is at least one ultraviolet absorbing agent selected from the group consisting of a triazine-based ultraviolet absorbing agent, a benzophenone-based ultraviolet absorbing agent, a benzotriazole-based ultraviolet absorbing agent, a phenyl salicylate-based ultraviolet absorbing agent, and a phenyl benzoate-based ultraviolet absorbing agent.

As an aspect, a benzophenone-based ultraviolet absorbing agent is preferable from a viewpoint that the benzophenone-based ultraviolet absorbing agent can be contained in a large amount in a coating composition containing the resin composition of the present invention. As another aspect, a triazine-based ultraviolet absorbing agent and a benzotriazole-based ultraviolet absorbing agent are preferable from a viewpoint that yellowing of a substrate such as polycarbonate can be prevented.

In the present invention, as the ultraviolet absorbing agent, an ultraviolet absorbing agent having a maximum absorption wavelength in the range of 240 to 380 nm is preferable.

Examples of the ultraviolet absorbing agent include a mixture of 2-[4-(2-hydroxy-3-dodecyloxypropyl)oxy-2-hydroxyphenyl]-4,6-[bis(2,4-dimethylphenyl)-1,3,5-triazine] and 2-[4-(2-hydroxy-3-tridecyloxypropyl)oxy-2-hydroxyphenyl]-4,6-[bis(2,4-dimethylphenyl)-1,3,5-triazine] (product name: Tinuvin (registered trademark, the same hereinafter) 400) manufactured by BASF Corporation, 2-[4-(octyl-2-methylethanoate)oxy-2-hydroxyphenyl]-4,6-[bis(2,4-dimethylphenyl)]-1,3,5-triazine (product name: Tinuvin 479), tris[2,4,6-[2-{4-(octyl-2-methylethanoate)oxy-2-hydroxyphenyl}]-1,3,5-triazine] (product name): Tinuvin 777), 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octadecyloxybenzophenone, 2,2'-dihydroxy 4-methoxybenzophenone, 2,2'-dihydroxy-4,4'-dimethoxybenzophenone, phenyl salicylate, p-tert-butylphenyl salicylate, p-(1,1,3,3-tetramethylbutyl)phenyl salicylate, 3-hydroxyphenylbenzoate, phenylene-1,3-dibenzoate, 2-(2-hydroxy-5'-methylphenyl)benzotriazole, 2-(2-hydroxy-5-tert-butylphenyl)-5-chlorobenzotriazole 2-(2-hydroxy-3,5-di-tert-butylphenyl)benzotriazole, 2-(2-hydroxy-5-tert-butylphenyl)benzotriazole, 2-(2-hydroxy-4-octylphenyl))benzotriazole, 2-(2'-hydroxy-5'-methacryloxyethyl phenyl)-2H-benzotriazole, and the like.

These may be used alone or two or more thereof may be used in combination.

A content of the ultraviolet absorbing agent in the resin composition of the present invention is preferably 1 part by mass to 40 parts by mass, and more preferably 5 parts by mass to 30 parts by mass with respect to the total mass (100 parts by mass) of the compound A, the polyisocyanate B, and the inorganic particle C.

In a case where the content of the ultraviolet absorbing agent is equal to or more than the lower limit, weather resistance of the coating film is easily improved. In a case where the content of the ultraviolet absorbing agent is equal to or less than the upper limit, curability of the coating composition and toughness, heat resistance, and abrasion resistance of the coating film are easily improved.

As the photostabilizer, a hindered amine-based photostabilizer can be used, for example. The hindered amine-based photostabilizer can further improve weather resistance of a cured film by being used in combination with an ultraviolet absorbing agent.

Examples of the hindered amine-based photostabilizers include a condensate of 1,2,3,4-butanetetracarboxylic acid, 1,2,2,6,6-pentamethyl-4-piperidinol, and β,β,β,β-tetramethyl-3,9-(2,4,8,10-tetraoxaspiro[5,5]undecane) diethanol (product name: ADEKA STAB (registered trademark, the same hereinafter) LA-63P) manufactured by ADEKA Corporation and a condensate of 1,2,3,4-butanetetracarboxylic acid, 2,2,6,6-pentamethyl-4-piperidinol, and β,β,β,β-tetramethyl-3,9-(2,4,8,10-tetraoxaspiro[5,5]undecane) diethanol (product name: ADEKA STAB LA-68P), a condensate of 1,1-dimethylethyl hydroperoxide and octane manufactured by BASF Corporation, bis(2,2,6,6-tetramethyl-1-(octyloxy)-4-piperidinyl) decandioate, a reaction product of 1,1-dimethylethyl hydroperoxide and octane (for example, Tinuvin (product name, the same hereinafter)123), bis(1,2,2,6,6-pentamethyl-4-piperidyl) 2-butyl-2-[3,5-di(tert-butyl)-4-hydroxybenzyl]malonate (product name): Tinuvin 144), 2,4-bis[N-butyl-N-(1-cyclohexyloxy-2,2,6,6-tetramethylpiperidine-4-yl)amino]-6-(2-hydroxyethylamine)-1,3,5-triazine (product name: Tinuvin 152), and a mixture of bis(1,2,2,6,6-pentamethylpiperidine-4-yl) sebacate and methyl (1,2,2,6,6)-pentamethylpiperidine-4-yl) sebacate (product name: Tinuvin 292), and the like.

The hindered amine-based photostabilizer may be used alone or two or more thereof may be used in combination.

A content of the hindered amine-based photostabilizer in the resin composition of the present invention is 0.1 part by mass to 5 parts by mass and more preferably 0.5 parts by mass to 2 parts by mass, with respect to the total mass (100 parts by mass) of the compound A, the polyisocyanate B, and the inorganic particle C.

In a case where the content of the hindered amine-based photostabilizer is equal to or more than the lower limit, weather resistance of the coating film is easily improved. In a case where the content of the hindered amine-based photostabilizer is equal to or less than the upper limit, curability of the coating composition, and toughness, heat resistance, and abrasion resistance of the coating film are easily improved.

<Production Method of Resin Composition>

For example, the resin composition of the present invention can be produced by uniformly mixing the compound A, the polyisocyanate B, and the inorganic particle C. Depending on the necessity, other components described above may be added.

The mixing method is not limited as long as each component can be uniformly mixed, and a known mixing method can be employed.

[Coating Composition]

The coating composition of the present invention contains the resin composition of the present invention. Depending on the necessity, a curing-accelerating catalyst, an organic solvent, a weather resistance imparting agent, an antioxidant, a yellowing inhibitor, a bluing agent, a pigment, a leveling agent, a defoamer, a thickener, an anti-settling agent, an antistatic agent, an anti-fogging agent, and the like are blended in the resin composition of the present invention.

<Curing-Accelerating Catalyst>

The coating composition of the present invention can be cured at room temperature or by heating, and may contain a curing-accelerating catalyst depending on the necessity.

Examples of the curing-accelerating catalyst include a salt of triethylamine, tetra(2-ethylhexyl)titanate, di-n-butyltin dilaurate, tertiary amine salts such as a salt of 1,4-diazabicyclo [2.2.2] octane and 1,5-diazabicyclo [4.3.0] nonene-5 (referred to as DBN), and a salt of 1,8-diazabicyclo [5.4.0] undecene-7 (referred to as DBU). Examples of the acid used for a tertiary amine salt include a saturated aliphatic carboxylic acid (acetic acid, propionic acid, butyric acid, valeric acid, isovaleric acid, methyl ethyl acetic acid, trimethyl acetic acid, caproic acid, isocaproic acid, diethyl acetic acid, 2,2-dimethylbutyric acid, enanthic acid, caprylic acid, pelargonic acid, 2-ethylhexanoic acid, n-undecylenic acid, lauric acid, n-tridecylenic acid, myristic acid, n-pentadecylenic acid, palmitic acid, margaric acid, stearic acid, n-nonadecylenic acid, arachidic acid, n-Hen Aiko acid, and the like), unsaturated aliphatic carboxylic acid (acrylic acid, crotonic acid, isocrotonic acid, vinylacetic acid, methacrylic acid, 2-pentenoic acid, 3-pentenoic acid, allylacetic acid, angelic acid, tiglic acid, 3-methylcrotonic acid, 2-hexenoic acid, 3-hexenoic acid, 4-hexenoic acid, 5-hexenoic acid, 2-methyl-2-pentenoic acid, 3-methyl-2-pentenoic acid, 4-methyl-2-pentenoic acid, 4-methyl-2-pentenoic acid, 4-methyl-3-pentenoic acid, 2-ethylcrotonic acid, 2-heptenoic acid, 2-octenoic acid, palmitoleic acid, oleic acid, vaccenic acid, linoleic acid, linolenic acid, elestearic acid, arachidonic acid, and the like), saturated aliphatic dicarboxylic acid (succinic acid, glutaric acid, methylsuccinic acid, adipic acid, ethyl succinic acid, pimelic acid, propylsuccinic acid, suberic acid, azelaic acid, sebacic acid, and the like), alicyclic carboxylic acid (cyclopropanecarboxylic acid, cyclobutanecarboxylic acid, cyclobutenecarboxylic acid, cyclopentanecarboxylic acid, cyclopentenecarboxylic acid, cyclohexanecarboxylic acid, cyclohexenecarboxylic acid, cycloheptanecarboxylic acid, cycloheptenecarboxylic acid, and the like), aromatic carboxylic acid (benzoic acid, alkyl-substituted benzoic acid (3-methylbenzoic acid, 4-methylbenzoic acid, 3-ethylbenzoic acid, 4-ethylbenzoic acid), 4-hydroxybenzoic acid, alkoxy-substituted benzoic acid (2-methoxybenzoic acid, 3-methoxybenzoic acid, 4-methoxybenzoic acid), mercaptobenzoic acid, amino-substituted benzoic acid, 2-naphthoic acid, and the like), hydroxycarboxylic acid (ascorbic acid and the like), ketocarboxylic acid (levulinic acid and the like), monoalkyl carbonate (methyl carbonate, ethyl carbonate, and the like); aromatic hydroxy compound (phenol, alkyl-substituted phenol (o-cresol, m-cresol, p-cresol, 2-ethylphenol, 3-ethylphenol, 4-ethylphenol, xylenol, trimethylphenol, tetramethylphenol, pentamethylphenol, and the like), alkoxy-substituted phenol (2-methoxyphenol, 3-methoxyphenol, 4-methoxyphenol, 2-ethoxyphenol, 3-ethoxyphenol, 4-ethoxyphenol, and the like), halogen-substituted phenol (fluorophenol, chlorophenol, bromophenol, iodophenol, and the like), naphthol, aminophenol, nitrophenol, polyhydric phenol (catechol, resorcinol, hydroquinone, biphenol, bisphenol, pyrogallol, phloroglucinol, hexahydroxy benzene, and the like)), thiophenol, carbonic acid, boric acid, and the like.

These may be used alone or two or more thereof may be used in combination.

The content of the curing-accelerating catalyst is preferably 0.001 parts by mass to 10 parts by mass, more preferably 0.01 parts by mass to 5 parts by mass, and further more preferably 0.1 parts by mass to 1 part by mass, with respect to the mass (100 parts by mass) of the polyisocyanate B.

<Organic Solvent>

Examples of the organic solvent include alcohol-based solvent such as methanol, isopropyl alcohol, n-butanol, diacetone alcohol, 2-methoxyethanol (methyl cellosolve), 2-ethoxyethanol (ethyl cellosolve), 2-butoxyethanol (butyl cellosolve), and tertiary amyl alcohol; carboxylate-based solvent such as ethyl acetate, n-propyl acetate, butyl acetate, and butyl formate; ketone-based solvent such as methyl ethyl ketone, methyl isobutyl ketone, acetone, and cyclohexanone; amide-based solvent such as dimethylformamide and dimethylacetamide; ether-based solvent such as diethyl ether, methoxytoluene, 1,2-dimethoxyethane, 1,2-dibutoxyethane, 1,1-dimethoxymethane, 1,1-dimethoxyethane, 1,4-dioxane, tetrahydrofuran, and the like; aliphatic hydrocarbon-based solvent such as hexane and pentane; aromatic hydrocarbon-based solvent such as toluene, benzene and xylene, and the like.

These may be used alone or two or more thereof may be used in combination.

[Coated Article]

The coated article of the present invention has a coating film formed of a cured product of the coating composition of the present invention.

The coated article of the present invention is obtained by applying the coating composition of the present invention to a substrate by a known coating method, and curing the coating composition of the present invention applied to the substrate.

Examples of the substrate include metal such as galvanized steel sheet, zinc alloy-plated steel sheet, stainless steel sheet, tin-plated steel sheet, polymethyl methacrylate resin, polycarbonate resin, polyester resin, polystyrene resin, ABS resin, AS resin, polyamide resin, and polyarylate resin, polymethacrylimide resin, polyallyl diglycol carbonate resin, and the like.

In particular, the coated article of the present invention is effective for improving abrasion resistance of a surface of a substrate in a case of using a polymethyl methacrylate resin, a polycarbonate resin, a polystyrene resin, and a polymethacrylimide resin as the substrate.

The application of the coating composition of the present invention to a substrate can be performed by a known method such as brush coating, bar coating, spray coating, dip coating, spin coating, curtain coating, and the like.

A curing temperature at a time of curing the coating composition of the present invention applied to the substrate may be appropriately set in consideration of heat resistance and heat deformability of the substrate, but is preferably 20° C. to 200° C. and more preferably 60° C. to 150° C.

A curing time at a time of curing the coating composition of the present invention applied to the substrate is preferably several minutes to several hours.

A thickness of the coating film formed of a cured product of the coating composition of the present invention in the coated article of the present invention is preferably 1 to 50 μm.

In a case where the thickness of the coating film in the coated article of the present invention is equal to or more than the lower limit, abrasion resistance and hardness of the coating film become favorable, and the high appearance is easily maintained for a long period of time. In a case where the thickness of the coating film in the coated article of the present invention is equal to or less than the upper limit, cracks are easily suppressed.

EXAMPLES

Hereinafter, the present invention will be described in more detail with reference to examples and comparative examples.

In the examples, unless otherwise specified, "parts" represents "parts by mass".

Each evaluation was performed by the following method.

<Weight Average Molecular Weight>

A weight average molecular weight (Mw) was measured by gel permeation chromatography (GPC) under the following conditions, and calculated in terms of standard polystyrene.

Device: High-speed GPC device HLC-8320GPC manufactured by Tosoh Corporation

UV detector: UV-8320 type manufactured by Tosoh Corporation

Flow rate: 0.35 mL/min

Inlet temperature: 40° C.

Oven temperature: 40° C.

RI temperature: 40° C.

UV wavelength: 254 nm

Sample injection amount: 10 μL

Column: 3 columns connected in order of (1) to (3).

(1) TSKgel (registered trademark, the same hereinafter) superHZM-M (4.6 mmID×15 cmL) manufactured by Tosoh Corporation (2) TSKgel superHZM-M (4.6 mm ID×15 cmL) manufactured by Tosoh Corporation (3) TSKgel HZ2000 (4.6 mm ID×15 cmL) manufactured by Tosoh Corporation Guard column: TSKguardcolumn SuperHZ-L (4.6 mm ID×3.5 cmL) manufactured by Tosoh Corporation Solvent: Tetrahydrofuran (THF) (including dibutylhydroxytoluene (BHT) as a stabilizer)

Sample concentration: Adjusted to 0.2% by mass resin content

<Evaluation Sample>

Each coating composition obtained in examples or comparative examples was bar-coated on a 3 mm-thick polycarbonate resin plate (manufactured by Mitsubishi Engineering Plastics Corporation, product name: "IUPILON (registered trademark, the same hereinafter) ML-300") such that the thickness of the film after curing was 10 μm. Thereafter, a coating film was formed on the polycarbonate resin plate by performing heat treatment at 120° C. for 30 minutes and evaluation was performed.

<Appearance of Coating Film>

The appearance of the coating film was evaluated by measuring the diffusion transmittance (haze value) with a haze meter (HM-65W, manufactured by Murakami Color Research Laboratory Co., Ltd.) in accordance with JIS K7136: 2000.

<Abrasion Resistance of Coating Film>

Abrasion resistance of the coating film was measured by placing steel wool #000 on the evaluation sample, using a flat abrasion tester (a scratch tester manufactured by KASAI Corporation), and after 50 reciprocal abrasion using a rubbing tester with a load of 250 g/1.1 cm$^2$, measuring diffuse transmittance (haze value) with a haze meter (HM-65W, manufactured by Murakami Color Research Laboratory Co., Ltd.).

Abrasion resistance was determined by a value (A haze value) obtained by subtracting an initial haze value from the measured haze value.

<Hardness of Coating Film>

Hardness of the coating film was evaluated by pencil hardness in accordance with ISO/DIS 15184. After the test, the highest hardness was employed as the pencil hardness of the coating film, among all scratch-free hardness.

(Dispersion Solution C-1 of Inorganic Particles)

To a flask A, 1.2 g of 3-mercaptopropyltrimethoxy silane manufactured by Tokyo Chemical Industry Co., Ltd., 0.6 g of distilled water, and 2.1 g of tetrahydrofuran were added, and stirred at 30° C. for 3 hours to obtain a silanol solution.

To a flask B, 100 g of methyl isobutyl ketone-dispersed silica sol (product name: "MIBK-ST", solvent: methyl isobutyl ketone, solid concentration: 30% by mass, average particle diameter: 15 nm) manufactured by Nissan Chemical Industries, Ltd. was added to raise the temperature to 70° C. The silanol solution in the flask A was added dropwise to the flask B, and after completion of the dropping, the resultant product was stirred at 70° C. for 1 hour to obtain a dispersion solution C-1 (solid content: 20%) of inorganic particles having a mercapto group.

(Method for Producing a Linear Compound which has a Terminal Hydroxyl Group)

A cooling tube and a stirrer were attached to a three-necked eggplant-shaped flask, 158.1 g of methyl isobutyl ketone (MIBK) was added, and the resultant product was heated to 65° C. while stirring in a nitrogen atmosphere. A mixture of 46.0 g of MIBK, 5.0 g (38 mmol) of hydroxyethyl methacrylate, 79.7 g (474 mmol) of cyclohexyl methacrylate, and 4.8 g of a polymerization initiator (Perhexyl PV manufactured by NOF Corporation, solid content 70%) was added dropwise over 2 hours, and then stirred at 65° C. for 5 hours. In addition, after the resultant product was raised to 85° C. and stirred for 1 hour and 30 minutes, it was cooled to room temperature to obtain a synthetic acrylic polyol 1 which is a linear compound which has a terminal hydroxyl group (solid content 30%, mass average molecular weight (Mw) 20,000, a theoretical hydroxyl value of 25 mg KOH/g).

Example 1

As the compound A, 30 parts of Boltorn P500 (the components will be described later, the same hereinafter), 5 parts of Praxel (registered trademark, the same hereinafter) 305, and 63 parts of Duranate TPA-100 as polyisocyanate B, 15 parts of dispersion solution C-1 of inorganic particles as inorganic particles C, 10 parts of Tinuvin 400 and 0.5 parts of Tinuvin 123 as ultraviolet absorbing agents, and 0.2 parts of BYK-333 as a surface-adjusting agent were used, these were uniformly mixed, and further diluted using butyl acetate such that the solid content became approximately 40%.

Table 1 shows the evaluation result of the obtained coating composition.

Examples 2 to 14 and Comparative Examples 1 to 3

With compositions shown in Tables 1 to 3, coating compositions were prepared in the same manner as in Example 1.

The evaluation results of the obtained coating compositions are shown in Tables 1 to 3.

In addition, the numerical value in the table indicates parts by mass, and the numerical values therein indicate a sold content value (parts by mass).

TABLE 1

| | | Example | | | | | | |
|---|---|---|---|---|---|---|---|---|
| | | 1 | 2 | 3 | 4 | 5 | 6 | 7 |
| Compound A | Boltorn P500 | 30(30) | 60(60) | 50(50) | 45(45) | 20(20) | 30(30) | 30(30) |
| | Basonol HPE 1170B | 0 | 0 | 0 | 0 | 0 | 0 | 0 |
| | Praxel 305 | 5(5) | 0 | 0 | 0 | 0 | 0 | 0 |
| Linear compound having hydroxyl group at terminal | Synthetic acrylic polyol 1 | 0 | 0 | 0 | 0 | 0 | 10(5.3) | 0 |
| Polyisocyanate B | Duranate TPA-100 | 63(63) | 25(25) | 50(50) | 50(50) | 77(77) | 59(59) | 0 |
| | Duranate 24A-100 | 0 | 0 | 0 | 0 | 0 | 0 | 58(58) |

TABLE 1-continued

| | | | Example | | | | | | |
|---|---|---|---|---|---|---|---|---|---|
| | | | 1 | 2 | 3 | 4 | 5 | 6 | 7 |
| Inorganic particle | Inorganic particle C | Dispersion solution C-1 of inorganic particles | 15(3) | 15(3) | 15(3) | 15(3) | 15(3) | 15(3) | 15(3) |
| | | Dispersion solution C-2 of inorganic particles | 0 | 0 | 0 | 0 | 0 | 0 | 0 |
| | Non-reactive inorganic particle | MEK-ST | 0 | 0 | 0 | 0 | 0 | 0 | 0 |
| Content of compound A (% by mass) | 100 × A/(A + B + C) | | 34.7 | 60 | 48.5 | 35 | 20 | 32.6 | 33.0 |
| Content of inorganic particle (% by mass) | 100 × C/(A + B + C) | | 3.0 | 3.0 | 2.9 | 3.0 | 3.0 | 3.3 | 3.3 |
| Ultraviolet absorbing agent | Tinuvin 400 | | 10(8.5) | 10(8.5) | 10(8.5) | 10(8.5) | 10(8.5) | 10(8.5) | 10(8.5) |
| | Tinuvin 123 | | 0.5 | 0.5 | 0.5 | 0.5 | 0.5 | 0.5 | 0.5 |
| Surface-adjusting agent | BYK-333 | | 0.2 | 0.2 | 0.1 | 0.2 | 0.2 | 0.1 | 0.2 |
| Diluting solvent | Butyl acetate | | 152 | 100 | 154 | 150 | 150 | 142 | 137 |
| Sum | | | 274.2 | 173.7 | 279.7 | 316.7 | 272.7 | 266.7 | 250.7 |
| Appearance | | | 0.5 | 0.3 | 0.3 | 0.3 | 0.3 | 1.1 | 0.3 |
| Abrasion resistance | | | 2.0 | 4.1 | 2.4 | 2.2 | 1.8 | 3.0 | 2.1 |
| Pencil hardness | | | F | HB | F | F | F | H | F |

TABLE 2

| | | | Example | | | | | | |
|---|---|---|---|---|---|---|---|---|---|
| | | | 8 | 9 | 10 | 11 | 12 | 13 | 14 |
| Compound A | Boltorn P500 | | 30(30) | 0 | 0 | 0 | 0 | 0 | 0 |
| | Basonol HPE 1170B | | 0 | 70(49.5) | 69(48.5) | 55(38.5) | 54(37.5) | 46(32.5) | 35(24.5) |
| | Praxel 305 | | 0 | 0 | 0 | 0 | 0 | 0 | 0 |
| Linear compound having hydroxyl group at terminal | Synthetic acrylic polyol 1 | | 0 | 0 | 0 | 0 | 0 | 0 | 0 |
| Polyisocyanate B | Duranate TPA-100 | | 0 | 0 | 0 | 0 | 0 | 0 | 0 |
| | Duranate 24A-100 | | 58(58) | 49.5(49.5) | 48.5(48.5) | 35(35) | 37.5(37.5) | 32.5(32.5) | 20(20) |
| Inorganic particle | Inorganic particle C | Dispersion solution C-1 of inorganic particles | 0 | 5(1.0) | 15(3.0) | 50(9.9) | 125(25) | 175(35) | 248(49.5) |
| | | Dispersion solution C-2 of inorganic particles | 15(3) | 0 | 0 | 0 | 0 | 0 | 0 |
| | Non-reactive inorganic particle | MEK-ST | 0 | 0 | 0 | 0 | 0 | 0 | 0 |
| Content of compound A (% by mass) | 100 × A/(A + B + C) | | 33.0 | 49.5 | 48.5 | 46.2 | 37.5 | 32.5 | 26.1 |
| Content of inorganic particle (% by mass) | 100 × C/(A + B + C) | | 3.3 | 1.0 | 3.0 | 11.9 | 25 | 35 | 52.7 |
| Ultraviolet absorbing agent | Tinuvin 400 | | 10(8.5) | 10(8.5) | 10(8.5) | 10(8.5) | 10(8.5) | 10(8.5) | 10(8.5) |
| | Tinuvin 123 | | 0.5 | 0.5 | 0.5 | 0.5 | 0.5 | 0.5 | 0.5 |
| Surface-adjusting agent | BYK-333 | | 0.2 | 0.2 | 0.2 | 0.2 | 0.2 | 0.2 | 0.2 |
| Diluting solvent | Butyl acetate | | 137 | 100 | 100 | 81 | 60 | 50 | 0 |
| Sum | | | 250.7 | 236.3 | 246.4 | 231.7 | 311.8 | 349.6 | 313.7 |
| Appearance | | | 0.3 | 0.2 | 0.2 | 0.4 | 0.9 | 1.1 | 1.1 |
| Abrasion resistance | | | 2.2 | 3.2 | 3.1 | 2.0 | 1.9 | 1.8 | 1.9 |
| Pencil hardness | | | F | F | F | H | H | H | H |

TABLE 3

| | | | Comparative Example | | |
|---|---|---|---|---|---|
| | | | 1 | 2 | 3 |
| Compound A | Boltorn P500 | | 0 | 0 | 0 |
| | Basonol HPE 1170B | | 93(65.1) | 0 | 70.1(49.5) |
| | Praxel 305 | | 0 | 0 | 0 |
| Linear compound having hydroxyl group at terminal | Synthetic acrylic polyol 1 | | 0 | 115(61) | 0 |
| Polyisocyanate B | Duranate TPA-100 | | 35(35) | 5(5) | 0 |
| | Duranate 24A-100 | | 0 | 0 | 49.5(49.5) |
| Inorganic particle | Inorganic particle C | Dispersion solution C-1 of inorganic particles | 0 | 15(3) | 0 |
| | | Dispersion solution C-2 of inorganic particles | 0 | 0 | 0 |
| | Non-reactive inorganic particle | MEK-ST | 10(3) | 0 | 0 |

TABLE 3-continued

|  |  | Comparative Example | | |
|---|---|---|---|---|
|  |  | 1 | 2 | 3 |
| Content of compound A (% by mass) | 100 × A/(A + B + C) | 63.1 | 0 | 50.0 |
| Content of inorganic particle (% by mass) | 100 × inorganic particle/(A + B + inorganic particle) | 2.9 | 3.0 | 0 |
| Ultraviolet absorbing agent | Tinuvin 400 | 10(8.5) | 10(8.5) | 10(8.5) |
|  | Tinuvin 123 | 0.5 | 0.5 | 0.5 |
| Surface-adjusting agent | BYK-333 | 0.2 | 0.2 | 0.2 |
| Diluting solvent | Butyl acetate | 142 | 100 | 100 |
|  | Sum | 290.7 | 248.7 | 231.3 |
|  | Appearance | 0.4 | 0.3 | 0.2 |
|  | Abrasion resistance | 12.6 | 14.3 | 9.2 |
|  | Pencil hardness | HB | H | HB |

The components in the table are as follows.

Boltorn P500:
Branched polyol manufactured by Perstorp Corporation, solid content 99%, hydroxyl value: 600 mg KOH/g, weight average molecular weight (Mw): 1,800, 10.70 mmol/g.

Basonol HPE 1170B:
A hyperbranched polymer having a terminal hydroxyl group, manufactured by BASF Corporation, solid content 70%, hydroxyl value: 280 mg KOH/g, weight average molecular weight (Mw): 1,800, 4.99 mmol/g.

Placed 305:
Polycaprolactonetriol manufactured by Daicel Chemical Co., Ltd., solid content 100%, hydroxyl value 305 mg KOH/g, weight average molecular weight (Mw): 550, 5.42 mmol/g, and one branch point in a molecule.

Synthetic acrylic polyol 1:
Solid content 53%, 0.45 mmol/g.

Duranate TPA-100:
Isocyanurate derivative of hexamethylene diisocyanate manufactured by Asahi Kasei Corporation, solid content 100%, 5.50 mmol/g.

Duranate 24A-100:
Biuret derivative of hexamethylene diisocyanate manufactured by Asahi Kasei Corporation, solid content 100%, 5.60 mmol/g.

Dispersion solution C-2 of inorganic particles:
Isocyanate group-containing MEK dispersed silica sol SIRMEK20 WT %-M70 (solid content 19%, average particle diameter of silica particles: 10 to 15 nm) manufactured by CIK Nanotech Corporation MEK-ST:
MEK dispersed silica sol manufactured by Nissan Chemical Industries, Ltd. (solid content: 30%, average particle diameter of silica particles: 10 to 15 nm, non-reactive inorganic particles)

Tinuvin 400:
A mixture of 2-[4-(2-hydroxy-3-dodecyloxypropyl)oxy-2-hydroxyphenyl]-4,6-[bis(2,4-dimethylphenyl)-1,3,5-triazine] and 2-[4-(2-hydroxy-3-tridecyloxypropyl)oxy-2-hydroxyphenyl]-4,6-[bis(2,4-dimethylphenyl)-1,3,5-triazine] manufactured by BASF Corporation, solid content 85%.

Tinuvin 123:
A reaction product of decanedioic acid bis(2,2,6,6-tetramethyl-1-(octyloxy)-4-piperidinyl) ester, 1,1-dimethylethyl hydroperoxide, and octane, manufactured by BASF Corporation.

BYK-333:
Silicon-based surface-adjusting agent manufactured by Big Chemie Japan Co., Ltd.

As shown in Table 3, in Comparative Example 1, since inorganic particles not having a functional group enabling reacting with a hydroxyl group or an isocyanate group on the surface were used, abrasion resistance was insufficient.

In Comparative Example 2, since the compound A having a branched structure which has a terminal hydroxyl group was not contained, abrasion resistance was insufficient.

Since Comparative Example 3 did not contain inorganic particles having a functional group enabling reacting with a hydroxyl group or an isocyanate group on the surface, abrasion resistance was insufficient.

INDUSTRIAL APPLICABILITY

Since the resin composition of the present invention is excellent in appearance, abrasion resistance, hardness and the like, it can be appropriately used for various lamp lenses for automobiles, hard coating for glazing, and the like.

The invention claimed is:

1. A resin composition comprising:
   a compound A which is a hyperbranched polymer having a terminal hydroxyl group;
   a polyisocyanate B; and
   an inorganic particle C which is a silica particle having a mercapto group enabling reacting with an isocyanate group on a surface thereof.

2. The resin composition according to claim 1, wherein a content of the compound A in a total mass (100% by mass) of the compound A, the polyisocyanate B, and the inorganic particle C is 5% by mass to 50% by mass.

3. The resin composition according to claim 1, wherein a weight average molecular weight of the hyperbranched polymer is 550 to 30,000.

4. The resin composition according to claim 1, wherein the compound A has a hydroxyl value of 20 mg KOH/g to 1,000 mg KOH/g.

5. The resin composition according to claim 1, wherein the polyisocyanate B is a trifunctional or higher functional isocyanate.

6. The resin composition according to claim 1,
   wherein the inorganic particle C is a silica particle surface-treated with a silane coupling agent having a mercapto group enabling reacting with an isocyanate group.

7. The resin composition according to claim 1,
wherein a content of the inorganic particle C in the total mass (100% by mass) of the compound A, the polyisocyanate B, and the inorganic particle C is equal to or more than 1% by mass and less than 55% by mass.

8. The resin composition according to claim 1, further comprising:
at least one ultraviolet absorbing agent selected from the group consisting of a triazine-based ultraviolet absorbing agent, a benzophenone-based ultraviolet absorbing agent, a benzotriazole-based ultraviolet absorbing agent, a phenyl salicylate-based ultraviolet absorbing agent, and a phenyl benzoate-based ultraviolet absorbing agent.

9. A coating composition comprising:
the resin composition according to claim 1.

10. A coated article having a coating film formed of the coating composition according to claim 9.

11. The resin composition according to claim 1,
wherein a content of the compound A is 5% by mass to 50% by mass, and a content of the inorganic particle C is equal to or more than 1% by mass and less than 55% by mass, in a total mass (100% by mass) of the compound A, the polyisocyanate B, and the inorganic particle C, and
a molar ratio of the isocyanate group of the polyisocyanate B to the terminal hydroxyl group of the compound A is from 0.5 to 2.0.

12. The resin composition according to claim 1,
wherein a content of the compound A is 5% by mass to 40% by mass, and a content of the inorganic particle C is 1% by mass to 10% by mass, in a total mass (100% by mass) of the compound A, the polyisocyanate B, and the inorganic particle C.

13. The resin composition according to claim 12, wherein a molar ratio of the isocyanate group of the polyisocyanate B to the terminal hydroxyl group of the compound A is from 0.7 to 1.8.

14. The resin composition according to claim 1,
wherein a content of the compound A is 5% by mass to 30% by mass, and a content of the inorganic particle C is 1% by mass to 10% by mass, in a total mass (100% by mass) of the compound A, the polyisocyanate B, and the inorganic particle C.

15. The resin composition according to claim 14, wherein a molar ratio of the isocyanate group of the polyisocyanate B to the terminal hydroxyl group of the compound A is from 0.7 to 1.8.

16. The resin composition according to claim 1, wherein inorganic particle C has an average particle diameter of 2 nm to 300 nm.

17. The resin composition according to claim 1, wherein inorganic particle C has an average particle diameter of 4 nm to 50 nm.

18. The resin composition according to claim 3,
wherein a content of the compound A is 5% by mass to 30% by mass, and a content of the inorganic particle C is 1% by mass to 10% by mass, in a total mass (100% by mass) of the compound A, the polyisocyanate B, and the inorganic particle C, and
a molar ratio of the isocyanate group of the polyisocyanate B to the terminal hydroxyl group of the compound A is from 0.7 to 1.8.

19. The resin composition according to claim 4,
wherein a content of the compound A is 5% by mass to 30% by mass, and a content of the inorganic particle C is 1% by mass to 10% by mass, in a total mass (100% by mass) of the compound A, the polyisocyanate B, and the inorganic particle C, and
a molar ratio of the isocyanate group of the polyisocyanate B to the terminal hydroxyl group of the compound A is from 0.7 to 1.8.

20. The resin composition according to claim 5,
wherein a content of the compound A is 5% by mass to 30% by mass, and a content of the inorganic particle C is 1% by mass to 10% by mass, in a total mass (100% by mass) of the compound A, the polyisocyanate B, and the inorganic particle C, and
a molar ratio of the isocyanate group of the polyisocyanate B to the terminal hydroxyl group of the compound A is from 0.7 to 1.8.

* * * * *